(12) United States Patent
Joo et al.

(10) Patent No.: US 8,085,232 B2
(45) Date of Patent: Dec. 27, 2011

(54) ARRAY SUBSTRATE RECEIVING TWO POLARITIES OPPOSITE TO EACH OTHER AND A DISPLAY DEVICE HAVING THE SAME

(75) Inventors: Soong-Yong Joo, Seongnam-si (KR); Myung-Koo Kang, Seoul (KR); Lintao Zhang, Yongin-si (KR); Jung-Sun Lee, Gwangju-si (KR); Suk-Ki Jung, Suwon-si (KR); Dong-Yub Lee, Siheung-si (KR); Jong-Hwa Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 843 days.

(21) Appl. No.: 11/454,651

(22) Filed: Jun. 16, 2006

(65) Prior Publication Data
US 2007/0063233 A1 Mar. 22, 2007

(30) Foreign Application Priority Data
Jul. 12, 2005 (KR) .................. 10-2005-0062476

(51) Int. Cl.
G09G 3/36 (2006.01)
(52) U.S. Cl. .................................. 345/96; 345/209
(58) Field of Classification Search .................. None
See application file for complete search history.

(56) References Cited

U.S. PATENT DOCUMENTS

| | | | | |
|---|---|---|---|---|
| 5,012,228 A * | 4/1991 | Masuda et al. | | 345/88 |
| 5,448,258 A * | 9/1995 | Edwards | | 345/90 |
| 5,657,039 A * | 8/1997 | Mizukata et al. | | 345/95 |
| 5,923,310 A * | 7/1999 | Kim | | 345/90 |
| 6,075,505 A * | 6/2000 | Shiba et al. | | 345/87 |
| 6,191,768 B1 * | 2/2001 | Imamura | | 345/98 |
| 6,219,019 B1 * | 4/2001 | Hasegawa et al. | | 345/96 |
| 6,707,441 B1 * | 3/2004 | Hebiguchi et al. | | 345/92 |
| 6,724,443 B1 * | 4/2004 | Sano et al. | | 349/39 |
| 2001/0024188 A1 * | 9/2001 | Masazumi et al. | | 345/100 |
| 2002/0084970 A1 * | 7/2002 | Ozawa | | 345/96 |
| 2003/0169247 A1 * | 9/2003 | Kawabe et al. | | 345/204 |
| 2003/0189537 A1 * | 10/2003 | Yun | | 345/87 |
| 2004/0201019 A1 * | 10/2004 | Kim et al. | | 257/59 |

FOREIGN PATENT DOCUMENTS
KR 1020030080353 10/2003
* cited by examiner

*Primary Examiner* — Alexander Eisen
*Assistant Examiner* — Matthew Yeung
(74) *Attorney, Agent, or Firm* — F. Chau & Associates, LLC (57) ABSTRACT

An array substrate includes a base substrate, a plurality of gate lines, a plurality of data lines and a pixel matrix. The plurality of gate lines and the plurality of data lines define pixel areas. The pixel matrix is formed on each pixel area, and includes a plurality of pixel columns and pixel rows. Each pixel column has a first pixel group and a second pixel group. The first pixel group is electrically connected to a first gate line adjacent to the pixel column. The second pixel group is electrically connected to a second gate line adjacent to the pixel column. Each pixel row is electrically connected to one data line adjacent to the pixel column.

17 Claims, 7 Drawing Sheets

|     | DL1 | DL2 | DL3 | DL4 | DL5 | DLm |
|-----|-----|-----|-----|-----|-----|-----|
| GL1 |     |     |     |     |     |     |
|     |  +  |  −  |  +  |  −  |     |  −  |
| GL2 |     |     |     |     |     |     |
|     |  −  |  +  |  −  |     |  −  |  +  |
| GL3 |     |     |     |     |     |     |
|     |  +  |  −  |  +  |  −  | ... |  −  |
| GL4 |     |     |     |     |     |     |
|     |     |     |  ⋮  |     |     |     |
| GLn |     |     |     |     |     |     |
|     |  +  |  −  |  +  |  −  |     |  −  |
| GLn+1 |   |     |     |     |     |     |

ARRAY SUBSTRATE RECEIVING TWO POLARITIES OPPOSITE TO EACH OTHER AND A DISPLAY DEVICE HAVING THE SAME

CROSS-REFERENCE TO RELATED APPLICATIONS

This application relies for priority upon Korean Patent Application No. 2005-62476 filed on Jul. 12, 2005, the contents of which are herein incorporated by reference in its entirety.

BACKGROUND OF THE INVENTION

1. Technical Field

The present disclosure relates to an array substrate and a display device having the array substrate. More particularly, the present disclosure relates to an array substrate capable of reducing power consumption and enhancing an image display quality and a display device having the array substrate.

2. Discussion of the Related Art

Generally, a liquid crystal display (LCD) device includes an array substrate, an opposite substrate that faces the array substrate and a liquid crystal layer disposed between the array substrate and the opposite substrate.

The array substrate includes a plurality of data lines extended along a first direction, a plurality of gate lines extended along a second direction that is different from the first direction, and a plurality of pixels that is formed on respective pixel areas. The data lines and the gate lines define the pixel areas. Each of the plurality of pixels includes a switching element, a pixel electrode and a storage electrode.

The opposite substrate includes a color filter and a common electrode. The color filter filters light to display colored images corresponding to each pixel. The common electrode faces the pixel electrode, and receives a common voltage. Accordingly, the pixel electrode and the common electrode define a liquid crystal capacitor, and the pixel electrode and storage electrode define a storage capacitor.

When a voltage having a predetermined polarity is continuously applied to a first electrode and a second electrode that are adjacent to a liquid crystal of an LCD device, the liquid crystal layer is gradually deteriorated. In order to prevent deterioration of the liquid crystal layer, the LCD device employs an inversion method that inverts a polarity of a data voltage applied to the liquid crystal with a predetermined period.

The inversion method may be classified into a frame inversion method, a line inversion method, a dot inversion method, etc. The frame inversion method is a driving method that applies data signals having an opposite polarity on a frame by frame basis. The line inversion method is a driving method that applies the data signals to each of the data lines after inverting the phase of the data signal for each of the data lines. The dot inversion method is a driving method that applies the data signals having an opposite polarity on a pixel by pixel basis along the data lines and the gate lines.

For example, the line inversion method inverts the common voltage level of the common electrode every horizontal line (1H) and inverts the data signal level with respect to the common voltage level.

The 1H is a time interval required for activating one gate line and may be represented by the following Expression 1.

$$1H = 1/(f \times \text{a number of gate lines}), \quad \text{Expression 1}$$

wherein 'f' represents a driving frequency of the LCD device.

In the line inversion method, when the resolution of the LCD device increases, the inversion frequency also increases. When the inversion frequency of the common voltage increases, however, the power consumption of the LCD device also increases.

SUMMARY OF THE INVENTION

Embodiments of the present invention provide an array substrate capable of reducing power consumption and increasing an aperture ratio thereof in order to enhance a luminance of a display device and a display device having the above-mentioned array substrate.

In an embodiment of the present invention, the array substrate includes a base substrate, a plurality of gate lines, a plurality of data lines, and a pixel matrix. The gate lines are formed on the base substrate. The data lines are formed on the base substrate and are electrically insulated from the gate lines. The data lines are extended along a different direction from the direction of the gate lines to define a plurality of pixel areas having a matrix shape. The pixel matrix is formed on a pixel area and has a plurality of pixel columns and pixel rows. Each pixel row of the pixel rows has a first pixel group and a second pixel group. The first pixel group is electrically connected to a first gate line adjacent to the pixel row. The second pixel group is electrically connected to a second gate line adjacent to the pixel row. Each of the pixel columns is electrically connected to one of the data lines, which is adjacent to the pixel column.

In an embodiment of the present invention, the array substrate includes a base substrate, a plurality of gate lines, a plurality of data lines and a pixel matrix. The gate lines are formed on the base substrate. The data lines are formed on the base substrate and are electrically insulated from the gate lines. The data lines are extended along a different direction from the direction of the gate lines so as to define a plurality of pixel areas having a matrix shape. The pixel matrix is formed on the pixel area and has a plurality of pixel columns and pixel rows. Each of the pixel rows includes a plurality of pixel groups electrically connected to adjacent gate lines, respectively, and each of the pixel columns are electrically connected to an adjacent data line.

In an embodiment of the present invention, the display device includes a display panel, a gate driving section and a data driving section. The display panel has an array substrate and an opposite substrate facing the array substrate displaying images. The gate driving section sequentially provides the array substrate with a plurality of gate signals. The data driving section provides the array substrate with a plurality of data signals. The array substrate includes a base substrate, a plurality of gate lines, a plurality of data lines and a pixel matrix. The gate lines are formed on the base substrate. The data lines are formed on the base substrate and electrically insulated from the gate lines. The data lines are extended along a different direction from the direction of the gate lines to define a plurality of pixel areas having a matrix shape. The pixel matrix is formed on the pixel area and has a plurality of pixel columns and pixel rows. Each pixel row of the pixel rows has a first and a second pixel group. The first pixel group is electrically connected to a first gate line adjacent to the pixel row. The second pixel group is electrically connected to a second gate line adjacent to the pixel row. Each of the pixel columns is electrically connected to one of the data lines, which is adjacent to the pixel column.

According to the array substrate and the display device described above, a polarity of a data signal that is applied to the pixel elements is controlled by a gate signal that is applied to each of plurality of gate lines, so that the driven display device consumes a relatively small amount of power and a decrease in aperture ratio of the display device is prevented.

BRIEF DESCRIPTION OF THE DRAWINGS

Exemplary embodiments of the present invention can be understood in more detail from the following descriptions taken in conjunction with the accompanying drawings wherein.

DESCRIPTION OF THE EXEMPLARY EMBODIMENTS

Exemplary embodiments of the present invention are described more fully hereinafter with reference to the accompanying drawings. This invention may, however, be embodied in many different forms and should not be construed as limited to the embodiments set forth herein.

Hereinafter, the present invention will be described in detail with reference to the accompanying drawings.

Figure 1:
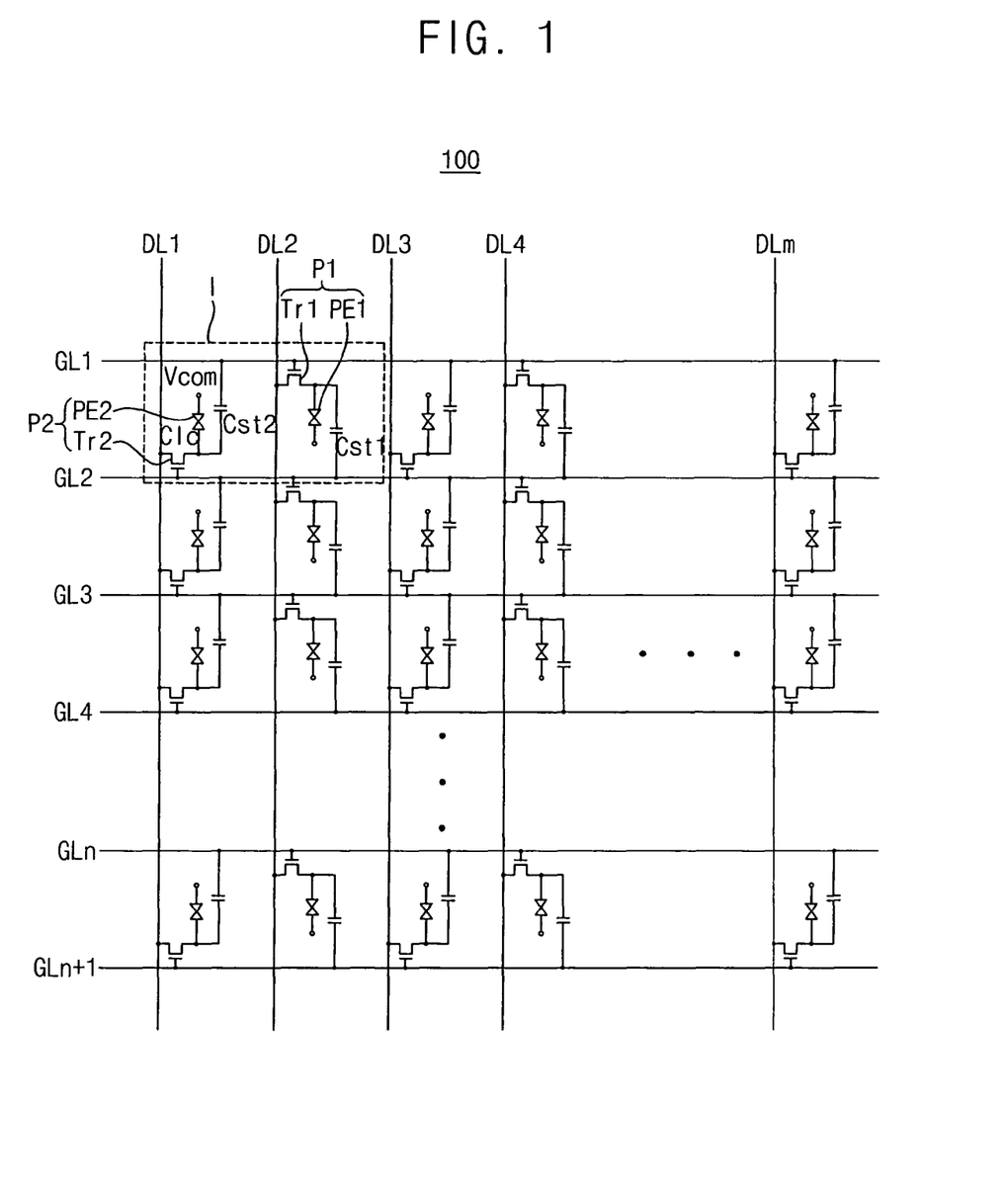
FIG. 1 is an equivalent schematic circuit diagram illustrating an array substrate according to an exemplary embodiment of present invention.

FIG. 1 is an equivalent schematic circuit diagram illustrating an array substrate according to an exemplary embodiment of present invention.

Referring to FIG. 1, an array substrate 100 includes a plurality of gate lines GL1~GLn+1 and a plurality of data lines DL1~DLm. The gate lines GL1~GLn+1 and the data lines DL1~DLm define a plurality of pixel areas arranged in a matrix shape, wherein 'n' and 'm' are natural numbers. The array substrate 100 includes a pixel array. The pixel array includes (n×m)-number of pixel elements that are defined by the n gate lines and the m data lines. In summary, the pixel array includes n-number of pixel rows, and m-number of pixel columns.

Each pixel row includes a first pixel group and a second pixel group, and the first and second pixel groups are electrically connected to different gate lines. The first pixel group includes a plurality of first pixel elements P1. Each of the first pixel elements P1 includes a first switching element Tr1 and a first pixel electrode PE1. For example, the first pixel elements P1 are the even-numbered pixel elements in each pixel row.

Particularly, in the first pixel row, the first switching element Tr1 is electrically connected to the first gate line GL1, and the first pixel electrode PE1 is electrically connected to the first switching element Tr1. Therefore, in the first pixel row, the first pixel group is driven in response to a gate signal applied from the first gate line GL1. Each of the first pixel elements P1 further includes a first storage capacitor Cst1 that is defined by the second gate line GL2 and the first pixel electrode PE1.

The second pixel group includes a plurality of second pixel elements P2. Each of the second pixel elements P2 includes a second switching element Tr2 and a second pixel electrode PE2. In this example, the second pixel elements P2 are the odd-numbered pixel elements in each pixel row.

In detail, in the first pixel row, the second switching element Tr2 is electrically connected to the second gate line GL2, and the second pixel electrode PE2 is electrically connected to the second switching element Tr2. Therefore, in the first pixel row, the second pixel group is driven in response to a gate signal applied from the second gate line GL2. Each of the second pixel elements P2 includes a second storage capacitor Cst2 that is defined by the first gate line GL1 and the second pixel electrode PE2.

In FIG. 1, the (n+1)-th gate line GLn+1 is added for driving the second pixel group in the n-th pixel row.

Alternatively, each pixel column is electrically connected in common to one of the adjacent data lines.

Figure 2:
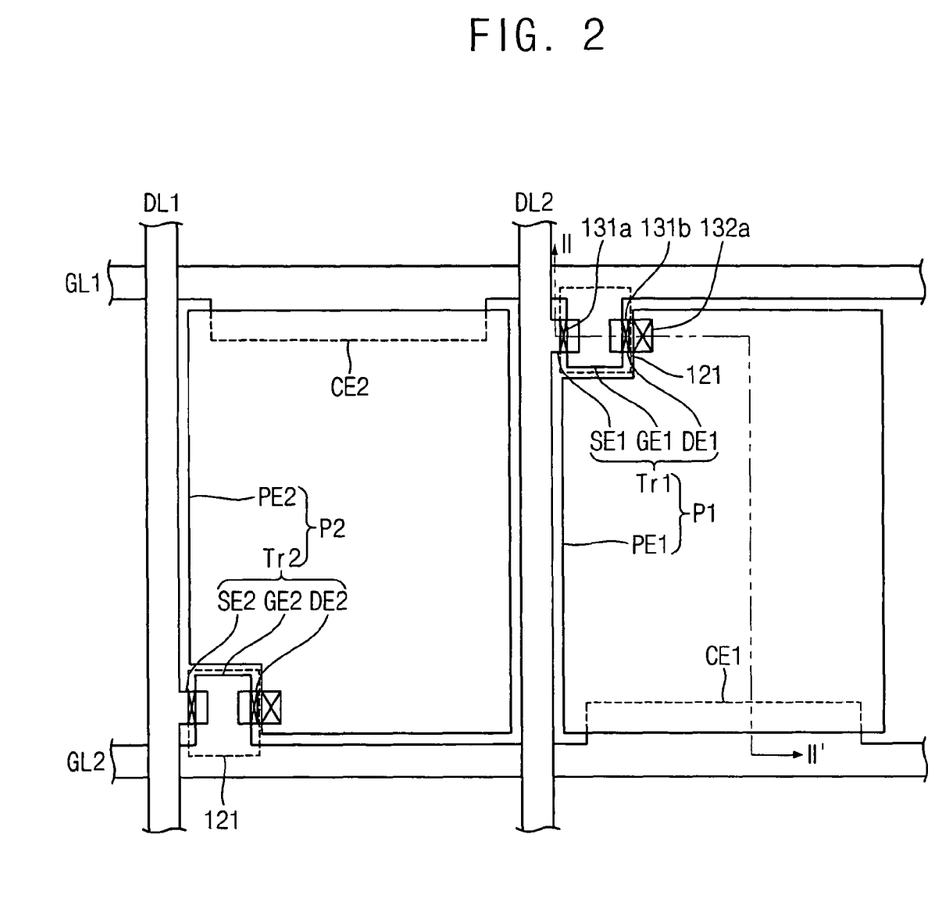
FIG. 2 is a layout illustrating an 'I' portion in FIG. 1.
Figure 3:
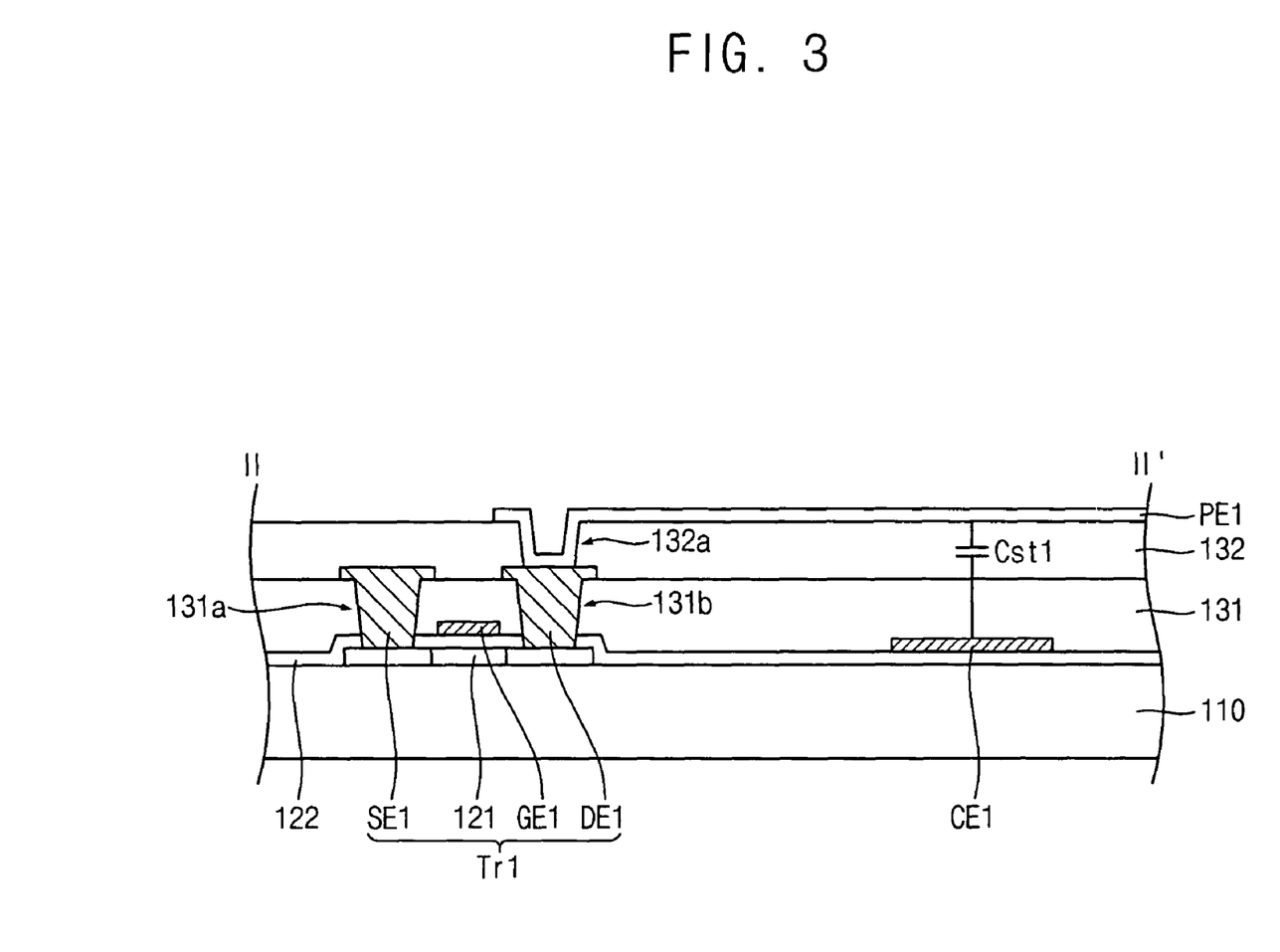
FIG. 3 is a cross-sectional view taken along line II-II' in FIG. 2.

FIG. 2 is a layout illustrating an 'I' portion shown by dashed lines in FIG. 1. FIG. 3 is a cross-sectional view taken along section line II-II' in FIG. 2.

Referring to FIGS. 2 and 3, a poly-silicon layer 121 is formed on the first base substrate 110 and a gate insulation layer 122 is formed on the base substrate 110 having the poly-silicon layer 121 formed thereon.

A first gate electrode (or control electrode) GE1 and a second electrode GE2 are formed on the gate insulation layer 122 corresponding to the poly-silicon layer 121. For example, the first gate line GL1 and the first gate electrode GE1 are formed from a metal as a first metal layer.

Additionally, a first gate line GL1 and a second gate line GL2 are formed on the gate insulation layer 122. The first gate electrode GE1 is diverged from the first gate line GL1, and the second gate electrode GE2 is diverged from the second gate line GL2.

Additionally, a first storage electrode CE1 that corresponds to a first electrode of the first storage capacitor Cst1 is extended from the second gate line GL2, and a second storage electrode CE2 that corresponds to a first electrode of the second storage capacitor Cst2 (see FIG. 1) is extended from the first gate line GL1.

Then, an n-channel or a p-channel is formed on the poly-silicon layer 121 by doping boron (B) or phosphorus (P).

An insulating interlayer 131 is formed on the gate insulation layer 122 that has the first and second gate electrodes GE1 and GE2 formed thereon. A first contact hole 131a and a second contact hole 131b are formed at the gate insulating layer 122 and the insulating interlayer 131, and expose a portion of the poly-silicon layer 121. A first source electrode SE1, a second electrode SE2, a first drain electrode DE1 and a second drain electrode DE2 are formed on the insulating interlayer 131. In more detail, the first source electrode SE1 is electrically connected to the poly-silicon layer 121 through the first contact hole 131a, and the first drain electrode DE1 is electrically connected to the poly-silicon layer 121 through the second contact hole 131b. Thereby, the first switching element Tr1 and the second switching element Tr2 of a poly-silicon type are formed on the first base substrate 110.

In FIGS. 2 and 3, the first and second switching elements Tr1 and Tr2 include a poly-silicon (poly-Si). Alternatively, the first and second switching elements Tr1 and Tr2 may include an amorphous-silicon (a-Si).

A first data line DL1 and a second data line DL2 are further formed on the insulating interlayer 131. The first source electrode SE1 is diverged from the first data line DL1. The first drain electrode DE1 and the first source electrode SE1 are spaced apart from each other. In this example, the first data line DL1, and the first drain and source electrodes DE1 and SE1 are formed from a second metal layer that is different from the first metal layer.

Additionally, the second source electrode SE2 is diverged from the second data line DL2. The second drain electrode DE2 and the second source electrode SE2 are spaced apart from each other.

Then, a protection layer 132 is formed on the insulating interlayer 131. For example, the protection layer 132 includes an inorganic insulating material. A third contact hole 132a is formed at the protection layer 132. The third contact hole 132a exposes the first and second drain electrodes DE1 and DE2. The first pixel electrode PE1 and the second pixel electrode PE2 are formed on the protection layer 132. In more detail, the first pixel electrode PE1 is electrically connected to the first drain electrode DE1 through the third contact hole 132a. The first and second pixel electrodes PE1 and PE2 include, for example, indium tin oxide (ITO) or indium zinc oxide (IZO).

The first pixel electrode PE1 faces the first storage electrode CE1. The insulating interlayer 131 and the protection layer 132 are disposed between the first pixel electrode PE1 and the first storage electrode CE1. Additionally, the second pixel electrode PE2 faces the second storage electrode CE2. The insulating interlayer 131 and the protection layer 132 are disposed between the second pixel electrode PE2 and the second storage electrode CE2. Accordingly, the first pixel electrode PE1 disposed over the first storage electrode CE1 corresponds to a second electrode of the first storage capacitor Cst1, and the second pixel electrode PE2 disposed over the second storage electrode CE2 corresponds to a second electrode of the second storage capacitor Cst2.

Figure 4:
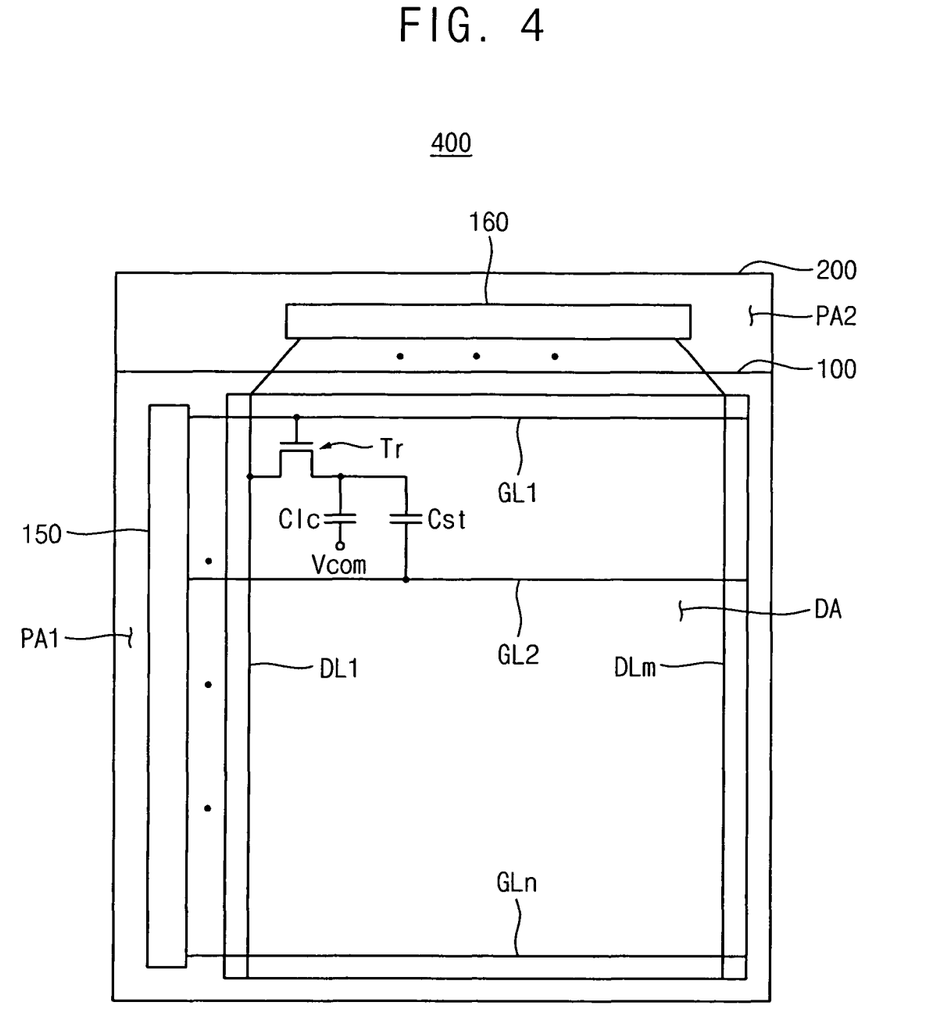
FIG. 4 is a plan view illustrating a display device according to an exemplary embodiment of the present invention.
Figure 5:
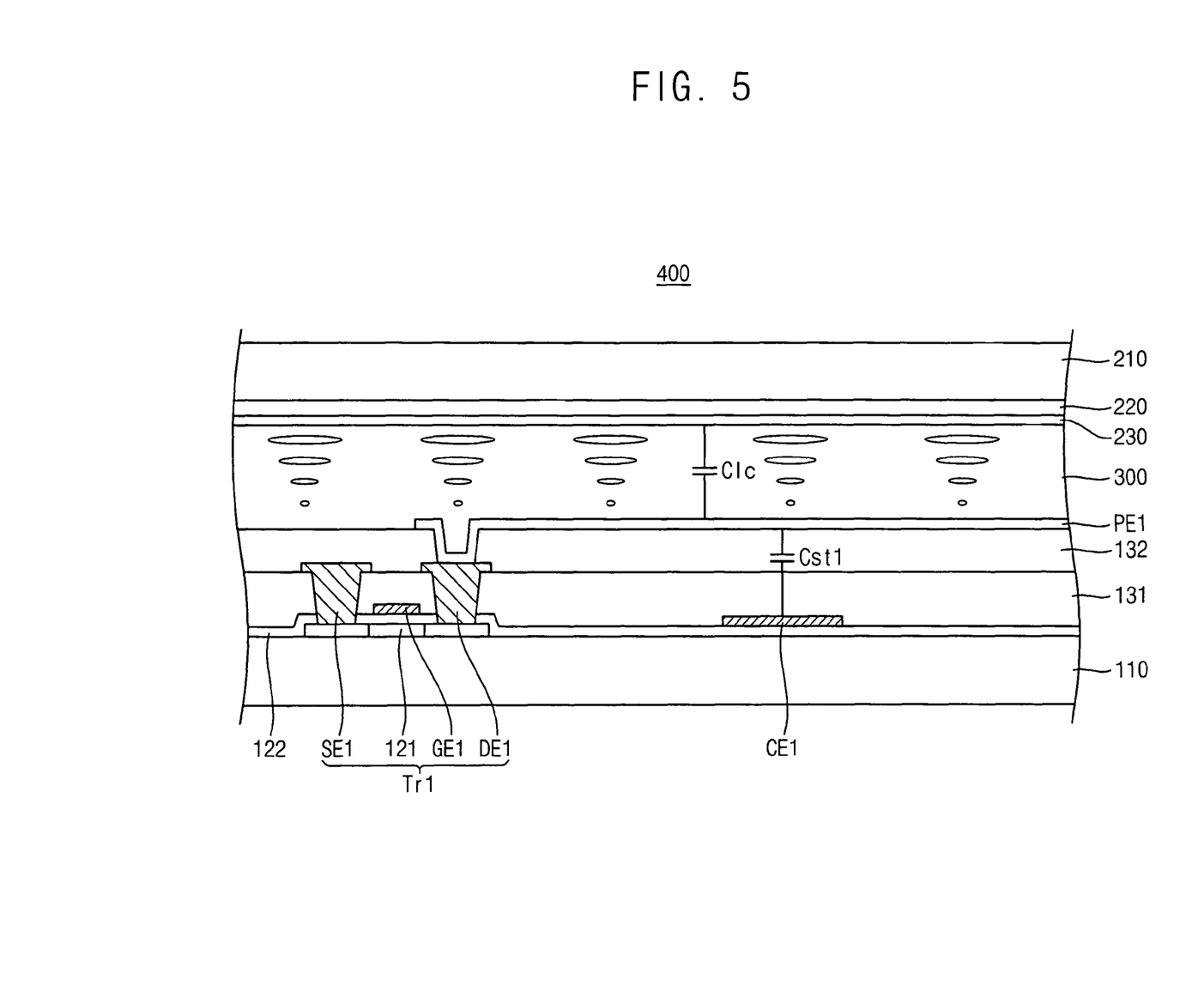
FIG. 5 is a cross-sectional view illustrating a display device in FIG. 4.

FIG. 4 is a plan view illustrating a display device according to an embodiment of the present invention. FIG. 5 is a cross-sectional view of the display device shown in FIG. 4.

Referring to FIGS. 4 and 5, a display device 400 according to an embodiment of the present invention includes a display panel displaying an image. The display panel includes an array substrate 100, an opposite substrate 200 facing the array substrate 100, and a liquid crystal layer 300 disposed between the array substrate 100 and the opposite substrate 200.

The array substrate 100 includes a first base substrate 110 of FIG. 5. The first base substrate 110 includes a display area DA, a first peripheral area PA1 adjacent to the display area DA and a second peripheral area PA2 arranged perpendicularly to the first peripheral PA1.

A plurality of gate lines GL1~GLn and a plurality of data lines DL1~DLm are formed in the display area DA. The gate lines GL1~GLn are electrically insulated from the data lines DL1~DLm. The gate lines GL1~GLn cross the data lines DL1~DLm. Therefore, a plurality of pixel areas arranged in a matrix shape is formed on the display area DA.

A gate driver circuit 150 is formed in the first peripheral area PA1. The gate driver circuit 150 is electrically connected to the gate lines GL1~GLn. The gate driver circuit 150 sequentially provides the gate lines GL1~GLn with a plurality of gate signals. In FIG. 4, the gate driver circuit 150 is directly formed on the base substrate 110 using a thin film process. Alternatively, the gate driver circuit 150 may be formed as a chip mounted on the first base substrate 110.

A data driver circuit 160 is formed on the second peripheral area PA2. The data driver circuit 160 is electrically connected to the data lines DL1~DLm. The data driver circuit 160 provides the data lines DL1~DLm with a plurality of data signals. The data driver circuit 160 is formed as a chip mounted on the first base substrate 110. Alternatively, the data driver circuit 160 may be directly formed on the base substrate 110 using a thin film process.

The opposite substrate 200 includes a second base substrate 210, a color filter layer 220 and a common electrode 230. The second base substrate 210 faces the first base substrate 110. The color filter layer 220 is formed on the second base substrate 210. The color filter layer 220 includes, for example, a red color filter, a green color filter and a blue color filter. The common electrode 230 is formed on the color filter layer 220. The common electrode 230 includes, for example, an optically transparent and electrically conductive material such as indium tin oxide (ITO) or indium zinc oxide (IZO), etc.

As shown in FIG. 5, the common electrode 230 faces the first pixel electrode PE1, and the liquid crystal layer 300 is disposed between the common electrode 230 and the first pixel electrode PE1. Accordingly, a liquid crystal capacitor Clc is defined by the common electrode 230, the first pixel electrode PE1 and the liquid crystal layer 300.

The first storage capacitor Cst1 is electrically connected to the liquid crystal capacitor Clc in parallel.

Figure 6:
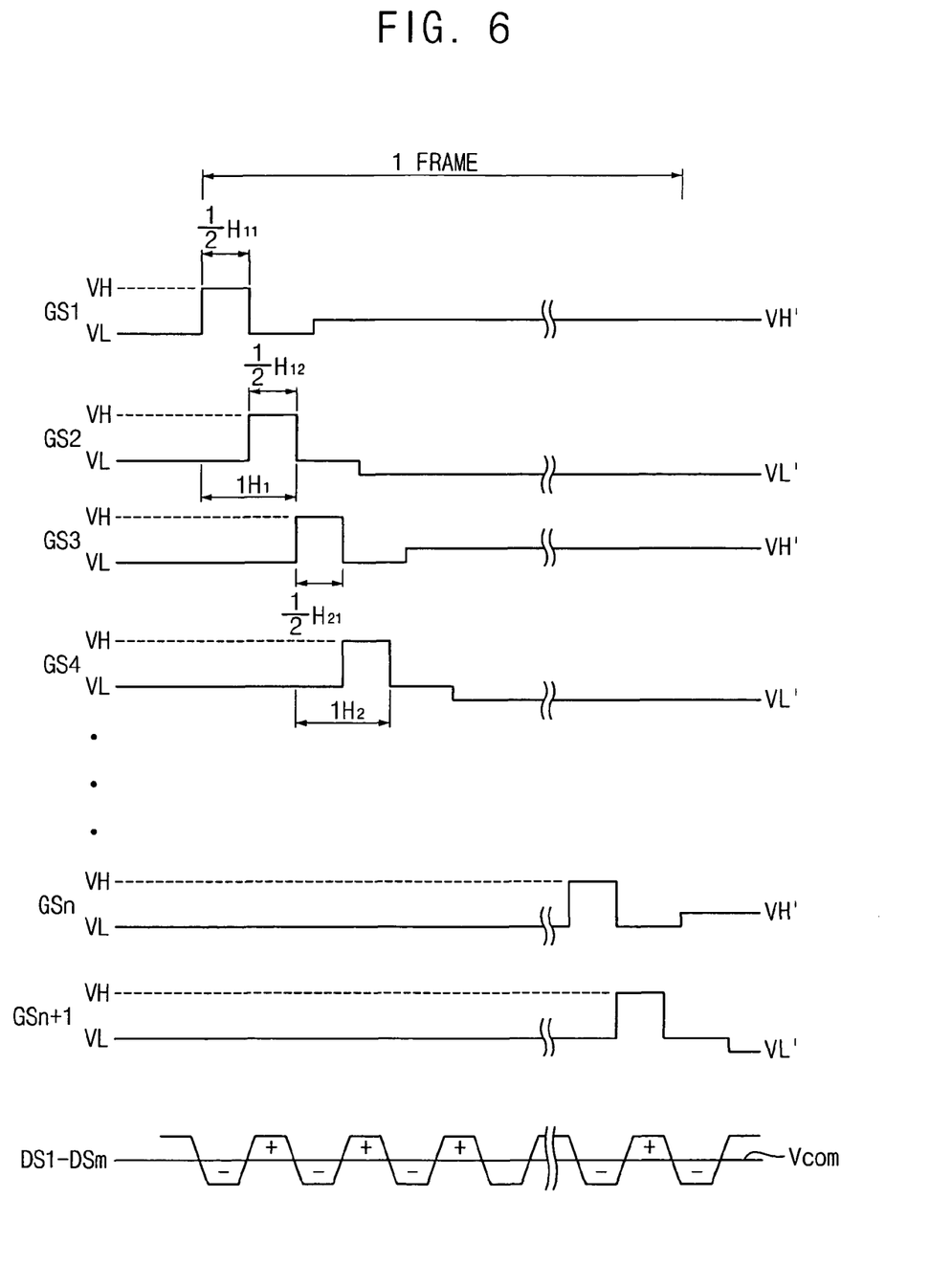
FIG. 6 is a waveform diagram showing gate signals from a gate driver circuit in FIG. 4.
Figure 7:
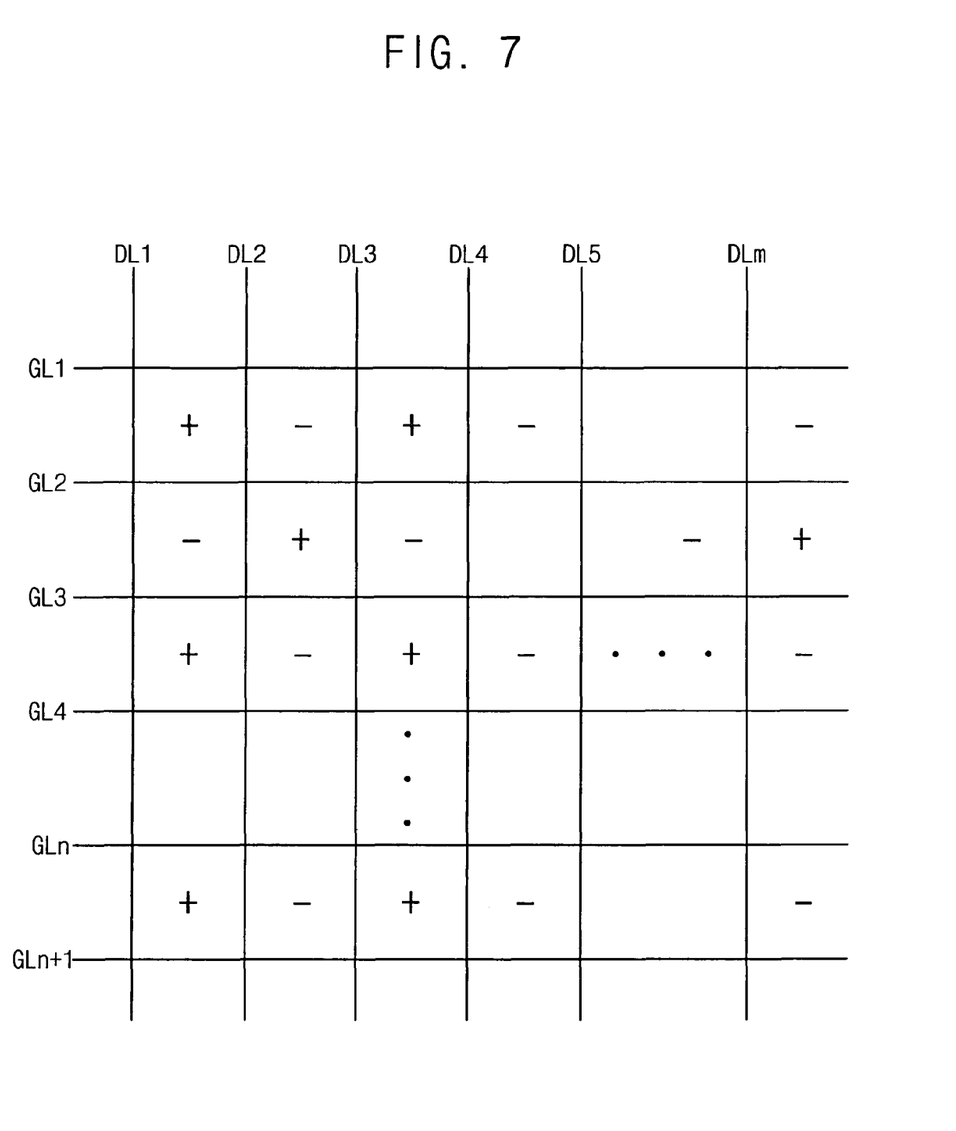
FIG. 7 is a diagram illustrating a polarity of a data signal from a data driver circuit in FIG. 4.

FIG. 6 is a waveform diagram showing gate signals from the gate driver circuit shown in FIG. 4. FIG. 7 is a diagram illustrating a polarity of a data signal from the data driver circuit shown in FIG. 4.

Referring to FIG. 6, a plurality of gate lines GL1~GLn+1 sequentially receives a first through (n+1)-th gate signals during one frame, wherein a 1H is a time interval for turning-on one pixel row.

The first gate signal GS1 maintains a first high voltage VH during an early period of a first time interval $\frac{1}{2}H_{11}$ of a first time interval $H_1$ for turning-on the first pixel row, and maintains a first low voltage VL during a latter period of a first time interval $\frac{1}{2}H_{12}$. The first gate signal GS1 rises to a second high voltage VH' after a late period of the first time interval $\frac{1}{2}H_{12}$. The second high voltage VH' is lower than the first high voltage VH but is higher than the first low voltage VL.

The first switching elements (see FIG. 1) of the first pixel group that is electrically connected to the first gate line are turned-on in response to the first signal GS1 during an early period of the first time interval. Then, even-numbered data signals among a plurality of data signals DS1~DSm transferred from the data lines DL1~DLm are applied to the first pixel electrode PE1 (see FIG. 1) of the first pixel group. For example, the data signals DS1~DSm have a negative polarity that is lower than a common voltage Vcom during an early period of the first time interval $\frac{1}{2}H_{11}$. Accordingly, the even-numbered pixels receive a negative data signal in the first pixel row as shown in FIG. 7.

On the other hand, the second gate signal GS2 maintains a first high voltage VH during a latter period of the first time interval $\frac{1}{2}H_{12}$ and maintains a first low voltage VL during an early period of the second time interval $\frac{1}{2} H_{11}$ of a second time 1$H_2$ during which the second pixel group is turned on. The second gate signal GS2 falls to a second low voltage VL' after the early period of the second time interval $\frac{1}{2}H_{21}$. The second low voltage VL' is lower than the first low voltage VL.

The second switching elements Tr2 (see FIG. 1) of the second pixel group that is electrically connected to the second gate line GL2 of the first pixel row are turned-on in response to the second gate signal GS2 during the latter period of the first time interval $\frac{1}{2}H_{12}$. Additionally, the first switching elements Tr1 of the first pixel group of the second pixel row, which is electrically connected to the second gate line GL2, are turned-on in response to the second gate signal GS2 during the early period of the second time interval $\frac{1}{2}H_{21}$. The first pixel group is electrically connected to the second gate line GL2 of the second pixel column. Then, odd-numbered data signals among a plurality of data signals DS1~DSm transferred from the data lines DL1~DLm are applied to the second pixel electrode PE1 of the second pixel group. Even-numbered data signals are applied to the first pixel electrode PE1 of the first pixel group.

For example, the data signals DS1~DSm have a positive polarity that is higher than a common voltage Vcom during the late period of the first time interval ½$H_{12}$. That is, the data signals DS1~DSm are inverted in polarity with respect to the common voltage Vcom every ½H time interval. Accordingly, the odd-numbered pixel elements of the first pixel row and the even-numbered pixel elements of the second pixel row receive a positive data signal as shown in FIG. 7.

As shown in FIG. 7, the first pixel group of the odd-numbered pixel rows receives a negative data signal, and the second pixel group of the odd-numbered pixel rows receives a positive data signal. Additionally, the first pixel group of the even-numbered pixel rows receives a positive data signal, and the second pixel group of the even-numbered pixel rows receives a negative data signal. As a result, the display device 400 is driven by a dot inversion method.

Referring again to FIG. 6, the first gate signal GS1 rises from the first low voltage VL to the second high voltage VH' after the latter period of the first time interval ½$H_{21}$. Accordingly, the positive data signal applied to the second pixel group of the first pixel row is raised by the second storage capacitor Cst2 electrically connected to the first gate line GL1.

On the other hand, the second gate signal GS2 falls from the first low voltage VL to the second low voltage VL' after the early period of the second time interval ½$H_{21}$. Accordingly, the negative data signal applied to the first pixel group of the first pixel row is lowered by the first storage capacitor Cst1 of the first pixel row, which is electrically connected to the first gate line GL1. Additionally, the negative data signal applied to the second pixel group of the second pixel row is lowered by the second storage capacitor Cst2 of the first pixel row, which is electrically connected to the second gate line GL2.

As described above, the first and second storage capacitors Cst1 and Cst2 may be controlled by the first through (n+1)-th gate signals GS1~GSn+1. Therefore, a capacitance of the liquid crystal capacitor Clc that is electrically connected to the first and second capacitors Cst1 and Clc2, as well as the power consumption, may be compensated. In this way, the display device 400 may be driven by a dot inversion method.

According to the array substrate and the display device described above, each pixel row is divided into two groups that are electrically connected to different gate lines so that a polarity of a data signal applied to the pixel elements is controlled by a gate signal that is applied to each gate line.

Accordingly, the display device may be driven with relatively lower power consumption by using a dot inversion method. Furthermore, an additional signal wiring is not required, because a polarity of a data signal is controlled by the gate signal. As a result, a decrease in an aperture ratio of the display device is prevented, and a display quality of the display device is enhanced.

Although embodiments of the present invention have been described, it is understood that the present invention should not be limited to these embodiments and various changes and modifications can be made by one of ordinary skill in the art within the spirit and scope of the present invention as hereinafter claimed.

What is claimed is:

1. An array substrate comprising:
   a base substrate;
   a plurality of gate lines formed on the base substrate, the plurality of gate lines comprising a first gate line and a second gate line which are adjacent to each other;
   a plurality of data lines formed on the base substrate and electrically insulated from the gate lines, the data lines crossing the plurality of gate lines and the data lines comprising a first data line and a second data line which are adjacent to each other; and
   a pixel group comprising a first pixel and a second pixel which are arranged in a first row and a third pixel which is arranged in a second row, each of the first pixel, the second pixel and the third pixel comprising a pixel electrode, wherein the first pixel is electrically connected to the first gate line, the second pixel is electrically connected to the second gate line and the third pixel is electrically connected to the second gate line, wherein the second gate line has a protrusion, wherein the protrusion juts out from the second gate line to the pixel electrode of the first pixel to be partially overlapped with the pixel electrode of the first pixel and form a first capacitor, wherein the first gate line has a protrusion, wherein the protrusion juts out from the first gate line to the pixel electrode of the second pixel to be partially overlapped with the pixel electrode of the second pixel and form a second capacitor, wherein the first and second pixels are electrically connected to the first and second data lines, respectively,
   wherein a first gate signal applied to the first gate line is at a high voltage during an early period of a time interval 1 H, and a second gate signal applied to the second gate line is at the high voltage during a latter period of the time interval 1 H, and
   wherein the first gate signal is at a low voltage during the latter period of the time interval 1 H of a first time period, and is raised to a first voltage that is higher than the low voltage after the latter period of the time interval 1 H of the first time period.

2. The array substrate of claim 1, wherein the first pixel comprises a first switching element electrically connected to the first gate line, and wherein the pixel electrode of the first pixel is electrically connected to the first switching element.

3. The array substrate of claim 1, further comprising an insulation layer disposed between the pixel electrodes of the first and second pixels and the gate lines.

4. The array substrate of claim 2, wherein the first switching element comprises a control electrode electrically connected to the first gate line, a first electrode electrically connected to the first data line and a second electrode electrically connected to the first pixel electrode.

5. The array substrate of claim 4, wherein the first gate line and the control electrode are formed from a first metal layer, and the first data line, and the first and second electrodes are formed from a second metal layer that is different from the first metal layer.

6. The array substrate of claim 1, wherein the second pixel comprises a second switching element electrically connected to the second gate line and wherein the pixel electrode of the second pixel is electrically connected to the second switching element.

7. A display device comprising:
   a display panel having an array substrate and an opposite substrate facing the array substrate to display images;
   a gate driving section providing the array substrate with a first gate signal and a second gate signal; and a data driving section providing the array substrate with a plurality of data signals, wherein the array substrate comprises:

a base substrate;

a plurality of gate lines formed on the base substrate, the plurality of gate lines comprising a first gate line and a second gate line which are adjacent to each other;

a plurality of data lines formed on the base substrate and electrically insulated from the gate lines, the data lines crossing the plurality of gate lines and the data lines comprising a first data line and a second data line which are adjacent to each other; and a pixel group comprising a first pixel and a second pixel which are arranged in a first row and a third pixel which is arranged in a second row, each of the first pixel, the second pixel and the third pixel comprising a pixel electrode, wherein the first pixel is electrically connected to the first gate line, the second pixel is electrically connected to the second gate line and the third pixel is electrically connected to the second gate line, wherein the second gate line has a protrusion, wherein the protrusion juts out from the second gate line to the pixel electrode of the first pixel to be partially overlapped with the pixel electrode of the first pixel and form a first capacitor, wherein the first gate line has a protrusion, wherein the protrusion juts out from the first gate line to the pixel electrode of the second pixel to be partially overlapped with the pixel electrode of the second pixel and form a second capacitor, wherein the first and second pixels are electrically connected to the first and second data lines, respectively, wherein the first gate signal applied to the first gate line is at a high voltage during an early period of a time interval 1 H, and the second gate signal applied to the second gate line is at the high voltage during a latter period of the time interval 1 H, and wherein the first gate signal is at a low voltage during the latter period of the time interval 1 H of a first time period, and is raised to a first voltage that is higher than the low voltage after the latter period of the time interval 1 H of the first time period.

8. The display device of claim 7, wherein the first pixel is turned-on in response to the high voltage of the first gate signal applied from the first gate line, and the second pixel is turned-on in response to the high voltage of the second gate signal applied from the second gate line, wherein the high voltage of the first gate signal and the high voltage of the second gate signal are sequentially provided to the first gate line and second gate line.

9. The display device of claim 8, wherein a first data signal of the plurality of data signals having a first polarity is applied to the first pixel through the first data line during the early period of the time interval 1 H, and a second data signal of the plurality of data signals with a second polarity having a phase opposite to a phase of the first polarity is applied to the second pixel through the second data line during the latter period of the time interval 1 H.

10. The display device of claim 9, wherein the polarity of the data signals is inverted every ½ H time interval.

11. The display device of claim 9, wherein the first polarity corresponds to a negative polarity and the second polarity corresponds to a positive polarity.

12. The display device of claim 11, wherein the second gate signal is at the low voltage during a half time interval ½ H after the latter period of time interval 1 H, and is lowered to a second voltage that is lower than the low voltage after the half time interval ½ H of the low voltage.

13. The display device of claim 8, wherein the first pixel further comprises:

a first switching element being electrically connected to the first gate line, wherein the pixel electrode of the first pixel is electrically connected to the first switching element, and wherein the array substrate further comprises an insulating layer disposed between the electrode of the first pixel and the second gate line.

14. The display device of claim 8, wherein the second pixel further comprises:

a second switching element being electrically connected to the second gate line, wherein the pixel electrode of the second pixel is electrically connected to the second switching element, and wherein the array substrate further comprises an insulating layer disposed between the electrode of the second pixel and the first gate line.

15. The display device of claim 8, wherein the first pixel is arranged at one of even-numbered columns in the row direction, and the second pixel is arranged at one of odd-numbered columns in the row direction.

16. The array substrate of claim 1, wherein an area of the first gate line that is overlapped by the second pixel electrode is blocked from view by the second pixel electrode when viewed from directly above and an area of the second gate line that is overlapped by the first pixel electrode is blocked from view by the first pixel electrode when viewed from directly above.

17. The array substrate of claim 1, wherein only one gate line is formed between the first row and the second row.

* * * * *